(12) United States Patent
Zhao et al.

(10) Patent No.: US 11,862,144 B2
(45) Date of Patent: Jan. 2, 2024

(54) AUGMENTED TRAINING DATA FOR END-TO-END MODELS

(71) Applicant: Microsoft Technology Licensing, LLC, Redmond, WA (US)

(72) Inventors: Rui Zhao, Bellevue, WA (US); Jinyu Li, Bellevue, WA (US); Yifan Gong, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 128 days.

(21) Appl. No.: 17/124,341

(22) Filed: Dec. 16, 2020

(65) Prior Publication Data
US 2022/0189461 A1    Jun. 16, 2022

(51) Int. Cl.
G10L 15/06 (2013.01)
G10L 13/07 (2013.01)
G10L 15/19 (2013.01)
G10L 15/26 (2006.01)

(52) U.S. Cl.
CPC ............ *G10L 15/063* (2013.01); *G10L 13/07* (2013.01); *G10L 15/19* (2013.01); *G10L 15/26* (2013.01)

(58) Field of Classification Search
CPC ....... G10L 13/07; G10L 15/063; G10L 15/19; G10L 15/26; G10L 15/16; G06N 20/00
See application file for complete search history.

(56) References Cited

U.S. PATENT DOCUMENTS 9,495,955 B1 * 11/2016 Weber ................... G10L 15/063
2020/0175961 A1 * 6/2020 Thomson ................ G10L 15/28
2021/0233510 A1 * 7/2021 Datta .................... G10L 15/005

OTHER PUBLICATIONS

Yi Chen, Chia-yu Wan and Lin-shan Lee, "Entropy-Based Feature Parameter Weighting for Robust Speech Recognition," 2006 IEEE International Conference on Acoustics Speech and Signal Processing Proceedings, 2006, pp. 41-44. (Year: 2006).*
Chan, et al., "Listen, Attend and Spell", In Repository of arXiv: 1508.01211, Aug. 20, 2015, pp. 1-16.
Graves, et al., "Connectionist Temporal Classification: Labelling Unsegmented Sequence Data with Recurrent Neural Networks", In Proceedings of the 23rd International Conference on Machine Learning, Jun. 25, 2006, pp. 369-376.

(Continued)

*Primary Examiner* — Angela A Armstrong
(74) *Attorney, Agent, or Firm* — Alleman Hall Creasman & Tuttle LLP

(57) ABSTRACT

A computer system is provided that includes a processor configured to store a set of audio training data that includes a plurality of audio segments and metadata indicating a word or phrase associated with each audio segment. For a target training statement of a set of structured text data, the processor is configured to generate a concatenated audio signal that matches a word content of a target training statement by comparing the words or phrases of a plurality of text segments of the target training statement to respective words or phrases of audio segments of the stored set of audio training data, selecting a plurality of audio segments from the set of audio training data based on a match in the words or phrases between the plurality of text segments of the target training statement and the selected plurality of audio segments, and concatenating the selected plurality of audio segments.

11 Claims, 6 Drawing Sheets

(56) References Cited

OTHER PUBLICATIONS

Graves, Alex, "Sequence Transduction with Recurrent Neural Networks", In repository of arXiv, arXiv:1211.3711, Nov. 14, 2012, 9 Pages.

Kim, et al., "Generation of large-scale simulated utterances in virtual rooms to train deep-neural networks for far-field speech recognition in Google Home", In Proceedings of 18th Annual Conference of the International Speech Communication Association, Aug. 20, 2017, pp. 379-383.

Park, et al., "SpecAugment: A Simple Data Augmentation Method for Automatic Speech Recognition", In Repository of arXiv: 1904.08779v3, Dec. 3, 2019, 6 Pages.

"International Search Report and Written Opinion Issued in PCT Application No. PCT/US21/060880", dated Mar. 17, 2022, 12 Pages.

Zhao, et al., "On Addressing Practical Challenges for RNN-Transducer", In Repository of arXiv:2105.00858v3, Jul. 18, 2021, 8 Pages.

\* cited by examiner

AUGMENTED TRAINING DATA FOR END-TO-END MODELS

BACKGROUND

End-to-end (E2E) automatic speech recognition (ASR) systems typically do not have a clear division between acoustic models, language models, and other models that are separate in a conventional hybrid ASR approach. E2E ASR, with the goal of directly mapping input speech features to output token sequences, has achieved state-of-the-art performance on a variety of tasks. However, incorporating acoustic model (AM), language model (LM), and pronunciation models in a single deep neural network (DNN) requires training data that has paired audio and text data, which can be expensive and time consuming to create.

SUMMARY

A computer system is provided. The computer system may include a processor configured to store a set of audio training data that includes a plurality of audio segments and metadata indicating a word or phrase associated with each audio segment. The processor may be configured to receive a set of structured text data that includes one or more target training statements that each include a plurality of text segments comprising a word or phrase. For a target training statement of the set of structured text data, the processor may be configured to generate a concatenated audio signal that matches a word content of the target training statement by comparing the words or phrases of the plurality of text segments of the target training statement to respective words or phrases of audio segments of the stored set of audio training data, selecting a plurality of audio segments from the set of audio training data based on a match in the words or phrases between the plurality of text segments of the target training statement and the selected plurality of audio segments, and concatenating the selected plurality of audio segments into the concatenated audio signal. The processor may be configured to generate an augmented set of training data that includes the set of structured text data paired with respective concatenated audio signals.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

E2E ASR, with the goal of directly mapping input speech features to output token sequences, has achieved state-of-the-art performance on a variety of tasks. Recently, E2E ASR has become increasingly used as an alternative to conventional hybrid speech recognition solutions. These hybrid solutions typically include a plurality of separate models, such as, for example, a lexicon model, an acoustic model, and a language model. Hybrid ASR solutions use these models in combination to perform ASR. In contrast, in an E2E AI model for ASR, these models are merged into one, i.e. only one model is trained to map an input audio signal directly to a word sequence that represents the speech content of the input audio signal.

E2E AI models have the advantage of simplified training and decoding processes compared to hybrid approaches. However, E2E approaches to ASR have several potential challenges. Firstly, adaptation of an E2E model to a new domain may be difficult or expensive compared to a traditional hybrid ASR approach. For example, the training data for adapting an E2E model to a new domain potentially requires paired audio and text data. In contrast, a hybrid approach may potentially be adapted to a new domain using only text data for the new domain to train the language model. Gathering audio data that is paired with text data for a new domain is typically more expensive compared to only text data. As a large amount of in-domain (audio-text) paired data is typically used to train an E2E AI model for ASR, adapting the E2E AI model to a new domain may potentially be time consuming and expensive. As used herein, the term "domain" may be defined as a logical group of utterances that share common characteristics. Several example domains may include application specific domains such as a video conferencing application domain, an email dictation application domain, etc. Each of these domains may share common speech patterns, similar words, and grammar. These domains may also share other types of audio characteristics such as background noise, codec used to encode a waveform, etc.

Another challenge of the E2E approach to ASR is that E2E AI models for ASR trained by conventional means are typically not as robust as the hybrid approach to diverse environments and scenarios. For example, an E2E model that is trained with data that contains clean audio with minimal background noise for a specific word in a first domain, and also trained with noisy audio for the same word in a second domain, the trained E2E model may potentially only accurately learn how to map a speech input to that word with clean speech input for the first domain and noisy speech input for the second domain. Thus, the E2E model may potentially be inaccurate in mapping noisy speech input for the first domain and clean speech input for the second domain.

Figure 1:
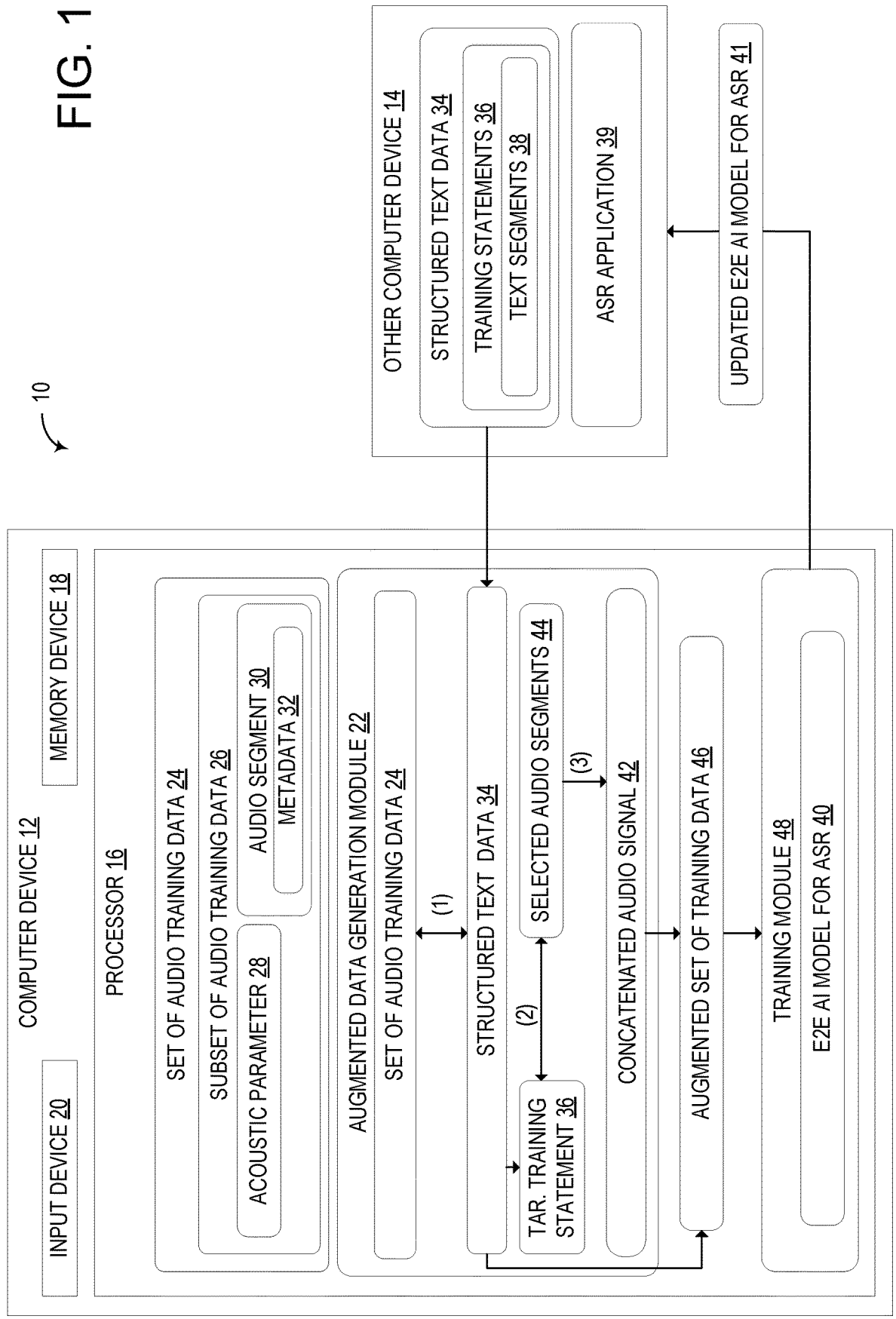
FIG. 1 shows a computer system that includes a computer device that implements an audio signal concatenation technique for generating augmented training data, according to one embodiment of the subject disclosure.

To address these issues, FIG. 1 illustrates an example computer system 10 that implements an audio concatenation technique to generate paired audio and text data for training an E2E model. The paired audio and text data generated by the techniques described herein may potentially reduce the high resources costs and time consumption typically required to gather large amounts of paired audio and text data for training an E2E AI model.

The audio training data generated by the audio concatenation, which will be described in more detail below, may be used to train any suitable type of E2E AI model, such as, for example, recurrent neural network transducer (RNN-T) and attention-based encoder-decoder (AED) models. However, it should be appreciated that the systems and processes described herein may also be implemented with other types of E2E models, and is not limited to the specific examples described herein.

The computer system 10 may include a computer device 12, and in some examples, another computer device 14 which may take the form of a user computer device configured to communicate with the computer device 12. The computer device 12 may take the form of a personal computer, a server computer, or another suitable type of computer device. In one example, the computer device 12 may take the form of a plurality of server computer devices configured to operate in a cloud computing configuration.

The computer device 12 may include one or more processors 16, memory devices 18, input devices 20, and other suitable computer components. The memory devices 18 may include volatile and non-volatile storage devices. The processor 16 of the computer device 12 may be configured to execute an augmented data generation module 22 that implements an audio concatenation technique to generate new audio training data by manipulating audio segments for words or other speech units, like phrases, word pieces, syllables, etc., from existing audio data.

For example, in order to generate audio data for an elevator domain text statement such as "elevator, open door", the augmented data generation module 22 may be configured to extract the audio segments of each word in the statement ("elevator", "open", and "floor") from existing audio training data stored on the computer device 12. The augmented data generation module 22 may be configured to concatenate those extracted audio segments together to generate a new audio segment that may be paired with the elevator domain text statement.

As will be described in more specific detail below, the audio segments associated with each of the words or phrases may not necessarily be recorded for the same speaker or the same acoustic environment. While the concatenated audio may sound odd to a human ear, the concatenated audio does not cause substantive inaccuracies in the training of an E2E AI model. By using the augmented data generation techniques described herein the computer device 12 may generate a large amount of new paired audio and text training data that may be used to provide potential improvements in the training of E2E AI models, such as RNN-T and AED models for ASR.

In one improvement, a robustness of a general domain for the E2E AI model may be improved by replacing the audio or acoustic feature of one word or other speech unit in one utterance with the audio of the same word from other utterance for the training data. That is, even though the general domain includes training data that has paired audio and text data for the statement "Please open the door" that is uttered by a single speaker, the robustness of the general domain may be improved by concatenated audio from multiple people to generate different variations of audio that may be paired with the same text statement. The augmented training data may provide the potential benefit of causing the E2E AI model to learn the real discriminative information for the word content, and ignore the variations that may be caused by different speakers or acoustic environments.

In a second improvement, an E2E AI model may be adapted to a target domain that does not have paired audio and text training data, or a target domain where gathering paired audio and text training data would be cost or time prohibitive. For example, large amounts of text training data may be gathered for the target domain. Even though the computer device 12 does not include audio data that matches the content of the text training data, the computer device 12 may generate new audio data that does match the text training data in the target domain by concatenated suitable audio segments from the general audio data stored on the computer device 12.

As illustrated in FIG. 1, the computer device 12 may be configured to store a set of audio training data 24 that is general audio data for the computer device 12. The set of audio training data 24 is recognized audio, and may be paired with corresponding text training data. The set of audio training data 24 may include one or more subsets of audio training data 26. The subsets of audio training data 26 may cover multiple domains, different acoustic environments, different speakers, etc. In one example, each subset of audio training data 26 may be recorded for different acoustic parameters 28, which may include, for example, a background noise parameter, an audio quality parameter, and a speech accent parameter. The background noise parameter may indicate whether the recorded audio for the subset of audio training data 26 is "clean" or "noisy". As a specific example, audio from an audio book recorded may potentially be recorded in a studio with minimal amounts of background noise, and would be "clean" audio. On the other hand, audio from an online meeting application may potentially include large amounts of background noise and audio artifacts from users in the meeting, and would be "noisy" audio.

The audio quality parameter may indicate whether the recorded audio for the subset of audio training data 26 is "poor" or "excellent" audio quality. For example, audio recorded by a studio grade microphone and enterprise audio applications may have less distortion and other audio artifacts. On the other hand, audio recorded by a user's webcam microphone for an online meeting or a cellphone, or audio that has been compressed, may potentially include a large amount of audio artifacts.

The speech accent parameter may indicate an accent or geographical location for a speaker that was recorded for the audio segment of the subset of audio training data 26. The audio training data 24 may include a plurality of subsets of audio training data 26 that cover a range of different accents for a particular language. The subsets of audio training data 26 may also cover a plurality of different speakers that may have different accents or speech styles. By covering a wide range of speakers, the set of audio training data 24 may be used to train a more robust E2E AI model that is more accurate when processing input audio for users that may cover a range of accents and speech styles.

As illustrated in FIG. 1, each subset of audio training data 26 includes a plurality of audio segments 30. Each audio segment 30 includes an audio signal for a particular word or phrase. In one example, the set of audio training data 24 is recognized audio, and the word content of the audio is already known. From example, the set of audio training data 26 may be paired with corresponding text training data. As another example, the audio segments 30 may be manually recognized and labeled by a user of the computer device 12.

In either example, each audio segment 30 may include or be associated with metadata 32 that indicates a word or phrase associated with that audio segment 30. That is, an audio segment 30 for an utterance of "open" may include metadata 32 indicating the word "open" for that audio segment 30. The metadata 32 is indexed on the computer device 12 and searchable by the augmented data generation module 22.

The plurality of subsets of audio training data 26 may include overlap in the word content of the audio segments 30 recorded with different acoustic parameters 28. For example, the plurality of subsets of audio data 26 include a plurality of audio segments 30 that are associated with a same word or phrase and different acoustic parameters 28. As a specific example, the plurality of subsets of audio training data 26 may include audio segments 30 for the word "open" that is uttered by a plurality of different people, or recorded in a plurality of different acoustic environments, or otherwise having different acoustic parameters 28. In this manner, the set of audio training data 24 may include audio segments 30 for the same word or phrase, but for a range of different domains, speakers, acoustic environments, and other parameters.

The computer device 12 may be configured to receive a set of structured text data 34 that includes one or more target training statements 36. It will be appreciated that the structured text data may include meta data such as word boundaries, sentence boundaries, pronunciations, and part of speech tags. The computer device 12 may be configured to use the metadata of the structured text data 34 to parse the text content and extract the one or more target training statements 36. Each of the target training statements 36 may include a plurality of text segments 38 comprising a word or phrase. However, it should be appreciated that the text segments 38 may comprise other linguistic units such as a sub-word, a phoneme, etc. The structured text data 34 is structured such that the training statements 36 are machine readable and include boundaries between each training statement 36. Each training statement 36 of the structured text data 34 may be processed to generate a paired concatenated audio corresponding to that training statement 36, as will be discussed in more detail below.

In the example illustrated in FIG. 1, the structured text data 34 is sent from another computer device 14 to the computer device 12 via a computer network, such as a wide area network (WAN). In this example, a user of the other computer device 14 may be developing or updating an ASR application 39 that uses an E2E AI model. It may be valuable to the user to update the E2E AI model used by the ASR application to be trained with a target set of text training data or a target domain. Thus, the user may generate the structured text data 34 to target a suitable training regime for an E2E AI model. For example, the user may collect and gather the structured text data 34 in the target domain, and send the structured text data 34 to the computer device 12. However, it should be appreciated that in other examples, the structured text data 34 is generated on the computer device 12. In one example, in order to improve a robustness of an E2E AI model 40 being trained by the computer device 12, the computer device 12 may use stored structured text data 34 from the paired audio and text training data in the general or source domain stored on the computer device 12. It should be appreciated that other examples of structured text data 34 not specifically described herein may also be used by the computer device 12.

The structured text data 34 is sent to the augmented data generation module 22 executed by the processor 16 of the computer device 12. The augmented data generation module 22 may be configured to process each training statement 36 of the structured text data 34 to generate a suitable paired audio signal. Specifically, in one example, for a target training statement 36 of the set of structured text data 34, the processor 16 may be configured to generate a concatenated audio signal 42 that matches a word content of the target training statement 36. Generating the concatenated audio signal 42 may include several steps.

At step (1), the processor 16 may be configured to compare the words or phrases of the plurality of text segments 38 of the target training statement 36 to respective words or phrases of audio segments 30 of the stored set of audio training data 24. For example, the processor 16 may be configured to extract the letters for the text segments 38 from the target training statement 36, and perform a string comparison, or another suitable type of comparison, with the metadata 32 associated with each audio segment 30 of the set of audio training data 24. Based on the comparison, the processor 16 may be configured to determine whether there are any matches between the text segments 38 and the audio segments 30.

At step (2), the processor 16 may be configured to select a plurality of audio segments 44 from the set of audio training data 24 based on a match in the words or phrases between the plurality of text segments 38 of the target training statement 36 and the selected plurality of audio segments 44. The processor 16 may be configured to also consider the acoustic parameters 28 when selecting the plurality of audio segments. For example, in order to improve a robustness of the trained E2E model 40, the processor 16 may be configured to select audio segments 30 that have a same word content, but different acoustic parameters 28.

At step (3), the processor 16 may be configured to concatenate the selected plurality of audio segments 44 into the concatenated audio signal 42. Concatenating the selected plurality of audio segments 44 may include extracting the audio signal from each of the plurality of audio segments, and merging the extracted audio signals into a single audio signal. In some example, the processor 16 may also be configured to perform further audio post-processing on the concatenated audio signal 42, such as volume equalization, audio smoothing, etc.

The processor 16 may be configured to perform steps (1)-(3) for each training statement 36 in the structured text data 34 until a corresponding concatenated audio signal 42 is generated for each training statement 36. The processor 16 may then be configured to generate an augmented set of training data 46 that includes the set of structured text data 34 paired with respective concatenated audio signals 42. It should be appreciated that the augmented set of training data 46 may be generated according to the process described above without requiring new audio data to be collected, thus providing the potential benefit of reduced costs in resources and time.

In one example, the computer device 12 may be configured to send the augmented set of training data 46 to the other computer device 14. In this manner, a user of the other computer device 14 may send the structured text data 34 to the computer device 12, and receive the augmented set of training data 46 that includes paired concatenated audio for the uploaded structured text data 34. The user of the other computer device 14 may then use the received augmented set of training data 46 to train an in-house E2E AI model for their application. In some examples, the augmented set of training data 46 may be used in addition to other training data, such as in-house training data of the user, to train the E2E AI model.

In another example, the processor 16 of the computer device 12 may be configured to execute a training module 48 configured to train the E2E AI model for ASR 40 using the augmented set of training data 46. In one example, the training module 48 may be configured to use the augmented set of training data 46 together with all or a portion of the set of audio training data 24 and corresponding text training data, or other sources of general training data stored by the computer device 12 to train the E2E AI model for ASR 40. In this manner, the augmented set of training data 46 may augment other sources of training data to improve the robustness of the E2E AI model for ASR. It should be appreciated that the augmented set of training data 46 includes paired audio and text training data, and may thus be used to train any suitable E2E AI model, such as an RNN-T or AED model, using any suitable training process.

In some examples, an updated E2E AI model 41 that has been trained using the augmented set of training data 46 may be sent to the other computer device 14. The other computer device 14, which may be a computer device for a user that is developing or updating an ASR application 39, may receive the updated E2E AI model 41 that has been trained using the augmented set of training data 46, and thus updated based on the structured text data 34 gathered by the other computer device 14. The other computer device 14 may then cause the ASR application 39 to execute using the updated E2E AI model 41.

Figure 2:
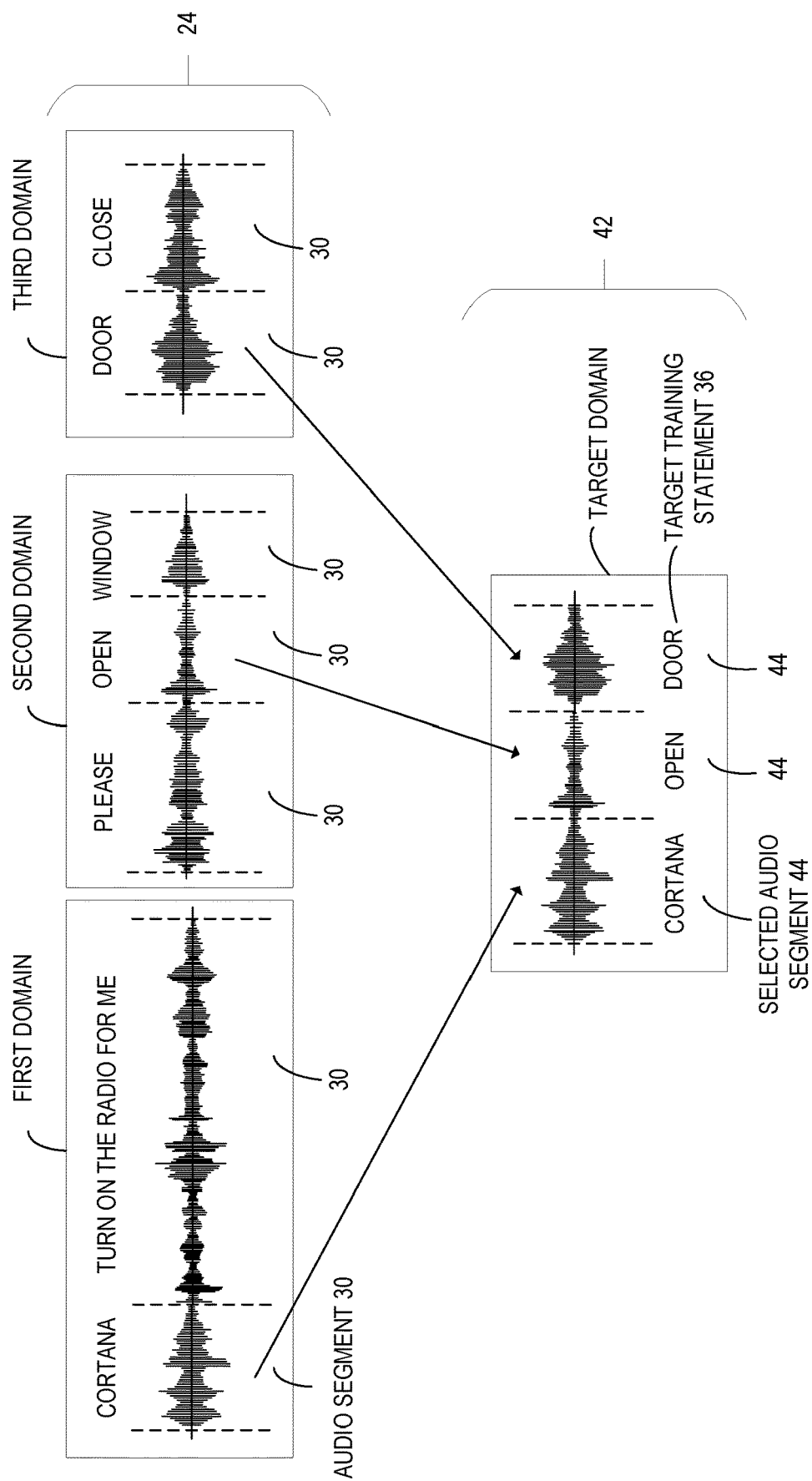
FIG. 2 shows an example of audio segments that are matched to a target training statement and concatenated into a concatenated audio signal using the computer system of FIG. 1.

FIG. 2 illustrates an example of concatenating an audio signal for target domain adaptation of an E2E AI model. In the example of FIG. 2, the set of audio training data 24 includes audio segments 30 from one or more domains including a first domain, second domain, and third domain. It should be appreciated that in other examples, the audio segments 30 may be selected from the same domain, or any number of domains. The set of structured text data 34 that includes the target training statement 36 is from a target domain that is different than the one or more domains of the set of audio training data 24. As the target domain is different, in this example the target training statement 36 includes a sequence of words that is new relative to the stored training data on the computer device 12. That is, the stored audio and text training data on the computer device 12 does not include paired audio and text data for the target training statement 36.

As discussed above, collecting new audio to be paired with the target training statement 36 may potentially be expensive. To address this issue, the computer device 12 may be configured to concatenate selected audio segments 30 from the set of audio training data 24 to generate the concatenated audio signal 42 that corresponds to the target training statement 36. In the specific example illustrated in FIG. 2, the target training statement 36 is "Cortana open door". While the set of audio training data 24 does not include this full statement, the set of audio training data 24 does include audio segments 30 for the phrases "Cortana turn on the radio for me", "Please open window", and "Door close". By performing the comparison at step (1) discussed above, the computer device 12 may select audio segments 44 associated with words "Cortana", "Open", and "Door" from the set of audio training data 24. The computer device 12 may then concatenate the selected audio segments 44 to generate the concatenated audio signal 42. This process may be performed for each training statement 36 in the structured text data 34, and compiled into the augmented set of training data 46. The augmented set of straining data 46 generated using this process may be used for adapting an E2E AI model to the target domain of the structured text data 34.

Figure 3:
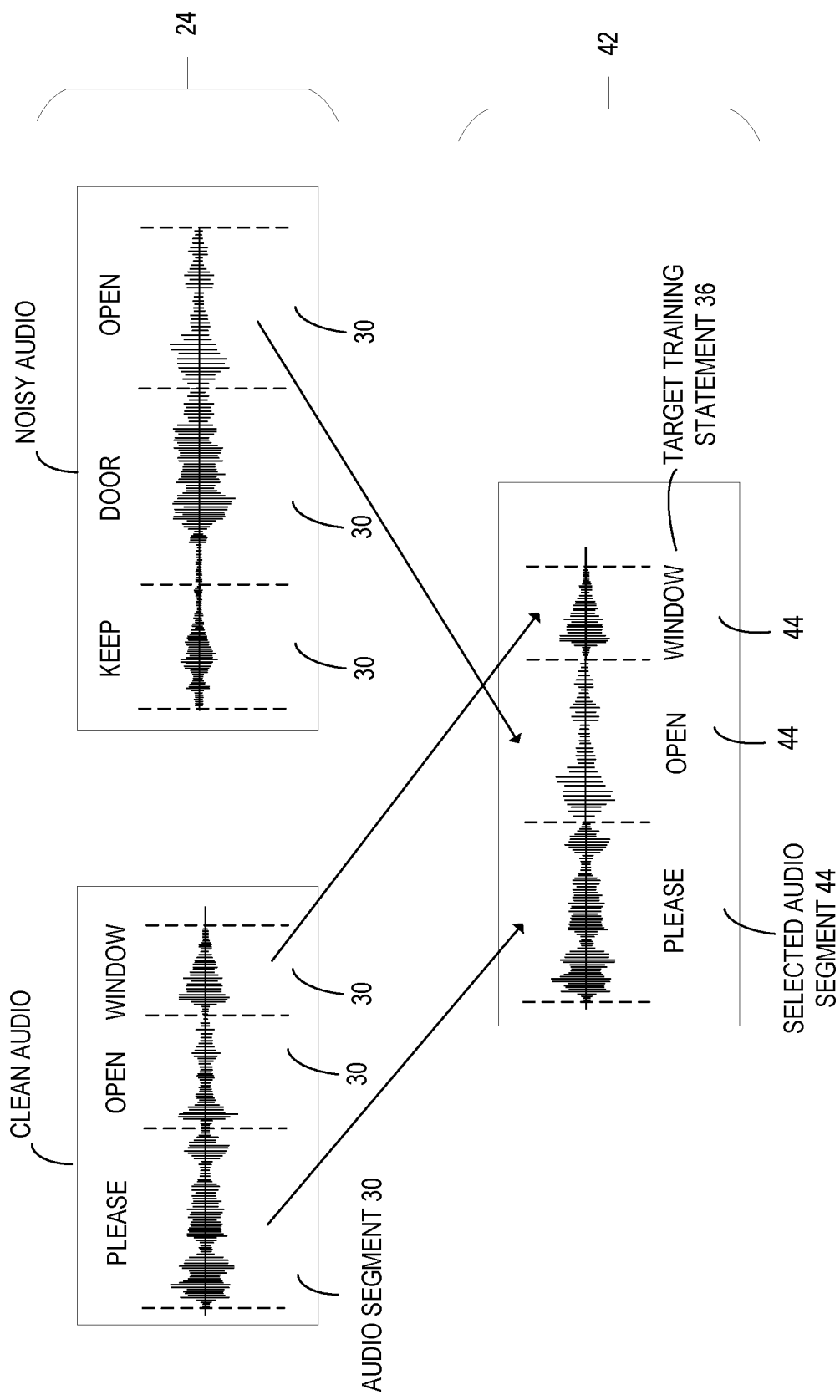
FIG. 3 shows another example of audio segments that are matched to a target training statement and concatenated into a concatenated audio signal using the computer system of FIG. 1.

FIG. 3 illustrates an example of concatenating audio segments having different acoustic parameters. In this example, the set of audio training data 24 and the set of structured text data 34 may be for the same domain. In the illustrated example, the target training statement 36 is the same phrase as the clean audio segments of "Please open window". That is, the target training statement 36 already exists in the general train data and has paired audio data. However, as discussed above, the computer device 12 may be configured to generate an augmented set of training data 46 that includes concatenated audio segments for different acoustics parameters. In the specific example of FIG. 3, audio segments 30 from a subset of audio having a "clean audio" acoustic parameter are being concatenated with audio segments 30 from a subset of audio having a "noisy audio" acoustic parameter.

To generate the concatenated audio signal 42, the processor 16 may be configured to match the word or phrase of the target training statement 36 (e.g. Please open window) to the plurality of audio segments 30 across the plurality of subsets of audio data, and select the plurality of audio segments 44 from the set of audio training data 24 to include at least two audio segments 30 that are selected from different subsets of audio data 26 for different acoustic parameters 28. In the example of FIG. 3, even though the subset of audio data 26 for the "clean audio" acoustic parameter includes an audio segment 30 corresponding to the word "open", the computer device 12 may be configured to instead select the audio segment 30 from the subset of audio data 26 for the "noisy audio" acoustic parameter corresponding to the word "open". The computer device 12 may then concatenate the audio segment 30 for "open" with the "noisy audio" acoustic parameter with the audio segments 30 for "please" and "window" with the "clean audio" acoustic parameter. The result is a concatenated audio signal 42 that matches the target training statement 36 and has intermixed acoustic parameters 28. It should be appreciated that a similar process may be used to generate a concatenated audio signal for a target training statement 36 of "Keep door open" that also includes audio segments with different acoustic parameters 28. Additionally, it should be appreciated that audio for more than two types of acoustic parameters 28 may be concatenated.

In one example, the processor 16 may be further configured to select the plurality of audio segments 30 from the set of audio training data 24 based on a distribution parameter that biases the selection for a target acoustic parameter 28. In the example illustrated in FIG. 3, the distribution parameter may be set to bias the concatenated audio signal 42 to include more audio segments 30 from the "clean audio" than the "noisy audio". It should be appreciated that the distribution parameter may bias the selection to more than one type of target acoustic parameter 28, such as, for example, to a clean audio acoustic parameter and an American English audio acoustic parameter simultaneously. These example distributions for the distribution parameter are merely exemplary, and it should be appreciated that the selection of the audio segments 30 may be biased toward different acoustic parameters 28 using other distributions. In this manner, a user may build an augmented set of training data 46 from concatenated audio signals that include audio segments 30 of the specified distribution for each of the specified acoustic parameters 28.

Figure 4:
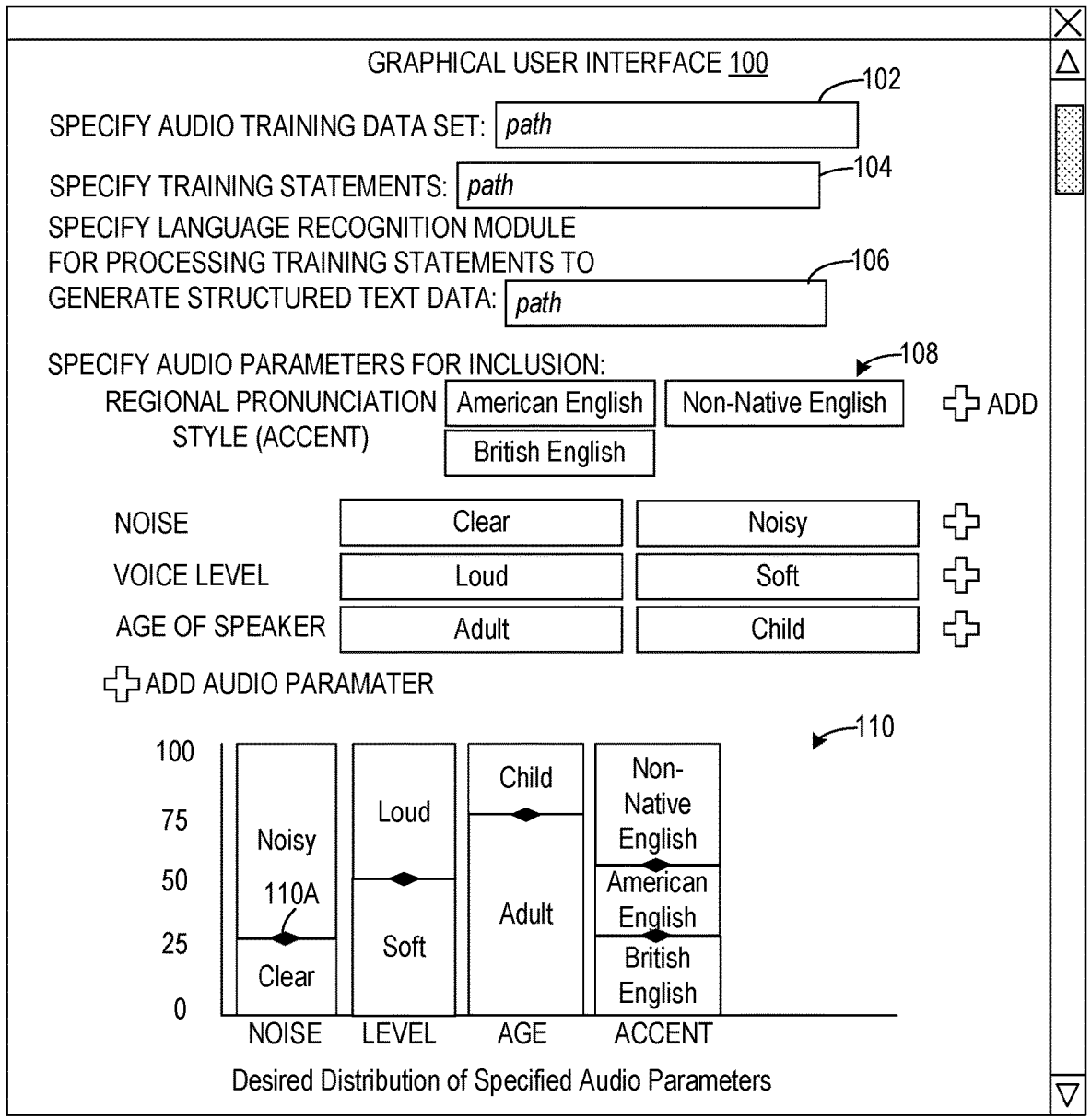
FIG. 4 illustrates an example graphical user interface (GUI) of the system of FIG. 1.

FIG. 4 illustrates an example graphical user interface (GUI) 100 of the system of FIG. 1. The GUI 100 includes a first selector 102 configured to receive user input specifying a path to the set of audio training data 24, a second selector 104 configured to receive a path to the training statements 36, a third selector 106 configured to receive a user input of a language recognition module that may be used to convert the training statements from text to structured text data 34, and a fourth selector 108 configured to receive user input of specified acoustic parameters 28 that are to be included in the augmented set of training data 46, and a fifth selector 110 by which a user may raise or lower affordances 110A to adjust the relative percentage of a particular acoustic 28 parameter to be included in the augmented data set of training data 46. In the illustrated example GUI 100, the user has selected to include 25% clear audio segments and 75% noisy audio segments, 50% loud and 50% soft voice level audio segments, 25% child and 75% adult age speakers in the audio segments, and 25% British English, 25% American English, and 50% Non-Native English in the audio segments used to form the augmented set of training data 42. This example GUI 100 is provided as an example, and it should be considered that numerous variations are possible.

Figure 5:
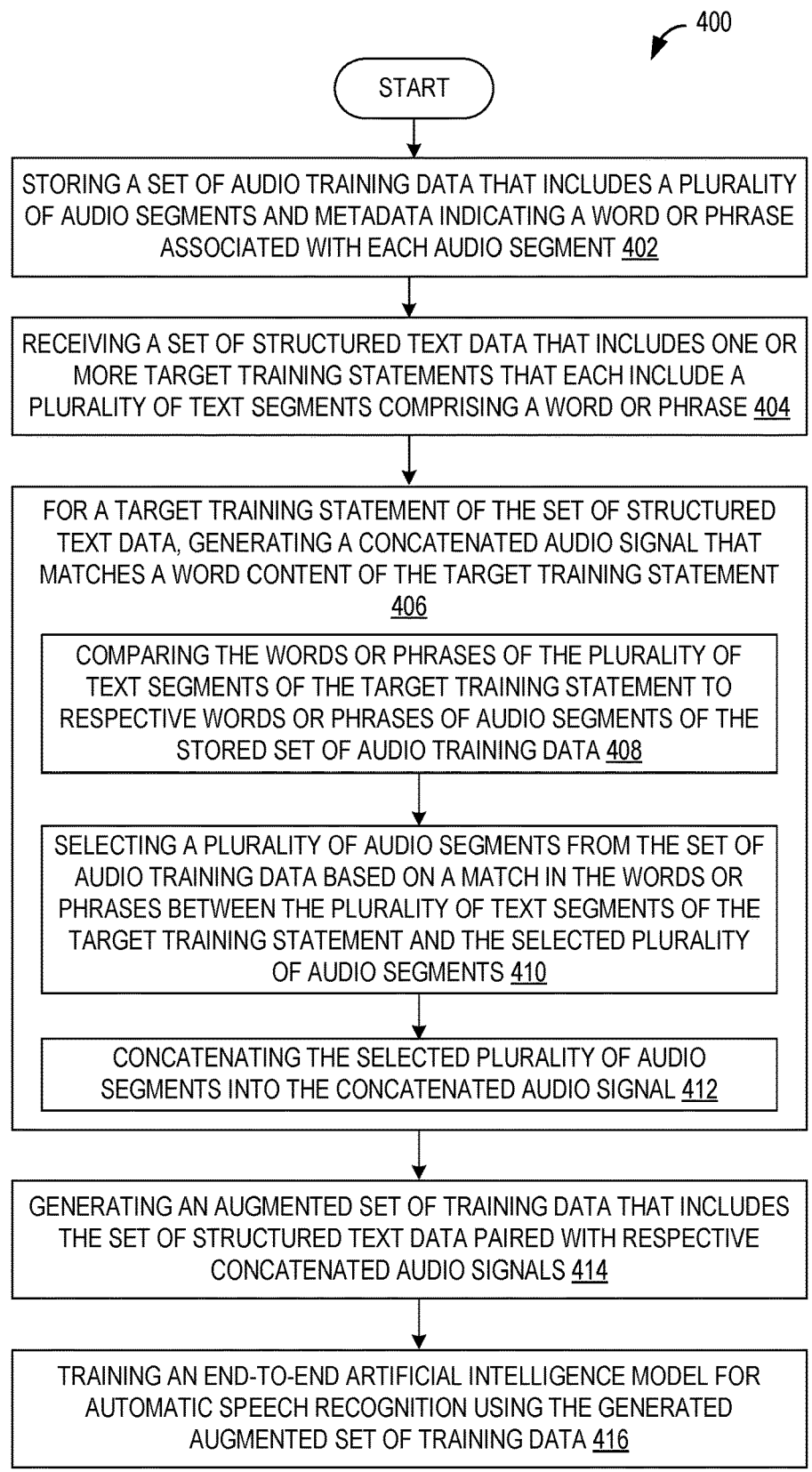
FIG. 5 shows a flowchart for a method of concatenating audio segments from a set of audio data for generating augmented training data that may be implemented by the computer system of FIG. 1.

FIG. 5 shows a flowchart for an example method 400 of concatenating audio segments from a set of audio data for generating augmented training data. The following description of method 400 is provided with reference to the software and hardware components described above and shown in FIG. 1. It should be appreciated that method 400 also can be performed in other contexts using other suitable hardware and software components.

At 402, the method 400 may include storing a set of audio training data that includes a plurality of audio segments and metadata indicating a word or phrase associated with each audio segment. The set of audio training data may include audio data for one or more domains, which may be referred to herein as a general domain or source domain of the computer system. The set of audio training data is recognized audio, and the metadata data indicates the word or phrase that corresponds to each audio segment. The metadata is indexed and computer searchable. In one example, set of audio data includes a plurality of subsets of audio data for different acoustic parameters which may include a background noise parameter, an audio quality parameter, and a speech accent parameter. The plurality of subsets of audio data include a plurality of audio segments that are associated with a same word or phrase and different acoustic parameters. In another example, the plurality of subsets of audio data are recorded from a plurality of different speakers.

At 404, the method 400 may include receiving a set of structured text data that includes one or more target training statements that each include a plurality of text segments comprising a word or phrase. In one example, the set of structured text data may be for a target domain that is different than the one or more domains of the set of audio training data. As used herein, the term "domain" may be defined as a logical group of utterances that share common characteristics. Several example domains may include application specific domains such as a video conferencing application domain, an email dictation application domain, etc. Each of these domains may share common speech patterns, similar words, and grammar. These domains may also share other types of audio characteristics such as background noise, codec used to encode a waveform, etc. In another example, the set of audio training data and the set of structured text data are for a same domain. The set of structured text data may include boundary data indicating a separation between the one or more included training statements. Words and phrases form the structured text data are extractable and comparable to the metadata associated with the set of audio data.

At 406, the method 400 may include, for a target training statement of the set of structured text data, generating a concatenated audio signal that matches a word content of the target training statement. Step 406 may include steps 408-412. At 408, the method 400 may include comparing the words or phrases of the plurality of text segments of the target training statement to respective words or phrases of audio segments of the stored set of audio training data.

At 410, the method 400 may include selecting a plurality of audio segments from the set of audio training data based on a match in the words or phrases between the plurality of text segments of the target training statement and the selected plurality of audio segments. In one example, step 410 may include selecting the plurality of audio segments from the set of audio training data to include at least two audio segments that are selected from different subsets of audio data for different acoustic parameters. Step 410 may also include selecting the plurality of audio segments from the set of audio training data based on a distribution parameter that biases the selection for a target acoustic parameter.

At 412, the method 400 may include concatenating the selected plurality of audio segments into the concatenated audio signal. Steps 408-412 may be completed for each target training statement of the set of structured text data.

At 414, the method 400 may include generating an augmented set of training data that includes the set of structured text data paired with respective concatenated audio signals. The set of audio training data used to generate the concatenated audio signals may be collected from a multitude of sources. As one example, the set of audio training data may be collected from audio book repositories that include both a speaker reading a book and the text of the book. As yet another example, the set of audio training data may be collected from sources of closed captioning or subtitles that are paired with audio of a video. As yet another example, the set of audio training data may be collected from dictation software that converts a user's speech input into text that is subsequently implicitly or explicitly verified by the user. As yet another example, the user's commands to a speech recognition enabled device, which are implicitly or explicitly verified by the user, could be used to collect the set of audio training data. It should be appreciated that other sources of audio and text data may be used to collect the set of audio training data. Prior to such data collection, participant's prior authorization for collection and use of the data is obtained, after informing the participants of the purposes to which the data will be used. The data is collected in a manner that does not associate personally identifiable information with the participants.

Additionally, the training statements of the training data may also be collected from a multitude of text sources. In one example, the training statements may be collected from a text source associated with a target domain, such as, text content from emails for an email dictation domain if data collection of those emails is allowed by the user via a data sharing agreement. In another example, the training statements may be manually written by a user to target specific words or phrases. As a specific example, elevator control applications may target specific phrases such as "Floor one", "Please close the door", etc. As another example, the training statements may be collected from the paired audio and text data of the already existing training data for E2E AI models.

In this example, to increase the robustness of the E2E AI model, a multitude of variations of concatenated audio signals may be generated using the techniques described herein for each training statement. That is, rather than a single pairing of a single audio signal with a single text statement, a multitude of variations of the audio signal may be generated by concatenating appropriate audio segments from different domains that have different acoustic parameters. In this manner, thousands of variations of audio signals that correspond to the same text statement may be synthetically generated and paired with that text statement. All of those variations may be collected into the augmented set of training data and used optionally or additionally to other training data such as the set of audio training data 24 and corresponding text training data to train an E2E AI model at step 416, which may result in a trained model that is more robust to variations in acoustic conditions and speech patterns than an E2E AI model that is trained using conventional training data.

At 416, the method 400 may include training an end-to-end artificial intelligence model for automatic speech recognition using the generated augmented set of training data.

The above described systems and method can be used to reduce the cost in resources and time typically required to achieve an increased variety in the paired audio and text training data set. The augmented training data generated by the described systems and method may be used to train a classifier that can recognize run time input speech under a variety of anticipated circumstances, such as containing audio that is uttered by non-native speakers, uttered by children vs. adults, uttered in a loud or soft voice, etc. This enables an ASR system trained using the augmented training data to more reliably understand the voice commands given to it, and properly process those commands, in an efficient manner that is pleasing to the user. Additionally, the augmented set of training data may be generated to improve different aspects of the E2E AI model. In one improvement, a robustness of a general domain for the E2E AI model may be improved by replacing the audio or acoustic feature of one word or other speech unit in one utterance with the audio of the same word from other utterance for the training data. The augmented training data may provide the potential benefit of causing the E2E AI model to learn the real discriminative information for the word content, and ignore the variations that may be caused by different speakers or acoustic environments. In a second improvement, an E2E AI model may be adapted to a target domain that does not have paired audio and text training data, or a target domain where gathering paired audio and text training data would be cost or time prohibitive.

In some embodiments, the methods and processes described herein may be tied to a computing system of one or more computing devices. In particular, such methods and processes may be implemented as a computer-application program or service, an application-programming interface (API), a library, and/or other computer-program product.

Figure 6:
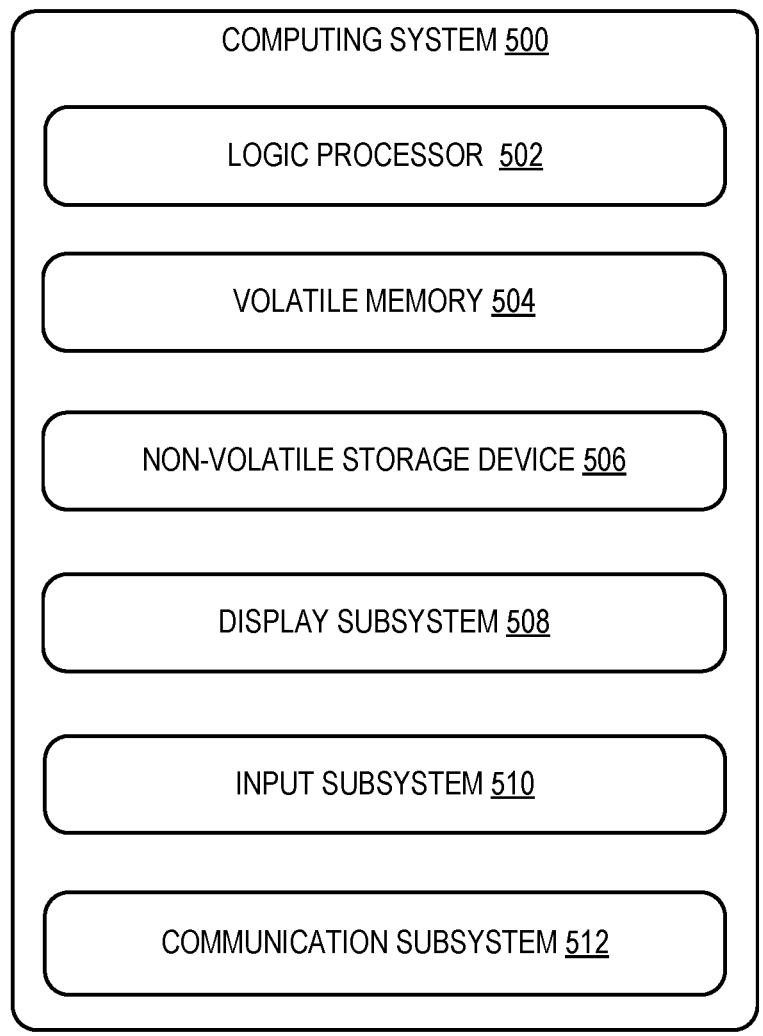
FIG. 6 shows a schematic view of an example computing environment in which the computer system of FIG. 1 may be enacted.

FIG. 6 schematically shows a non-limiting embodiment of a computing system 500 that can enact one or more of the methods and processes described above. Computing system 500 is shown in simplified form. Computing system 500 may embody the computer system 10 described above and illustrated in FIG. 1. Computing system 500 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 500 includes a logic processor 502 volatile memory 504, and a non-volatile storage device 506. Computing system 500 may optionally include a display subsystem 508, input subsystem 510, communication subsystem 512, and/or other components not shown in FIG. 6.

Logic processor 502 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 502 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 506 includes one or more physical devices configured to hold instructions executable by the logic processors to implement the methods and processes described herein. When such methods and processes are implemented, the state of non-volatile storage device 506 may be transformed—e.g., to hold different data.

Non-volatile storage device 506 may include physical devices that are removable and/or built-in. Non-volatile storage device 506 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 506 may include nonvolatile, dynamic, static, read/write, read-only, sequential-access, location-addressable, file-addressable, and/or content-addressable devices. It will be appreciated that non-volatile storage device 506 is configured to hold instructions even when power is cut to the non-volatile storage device 506.

Volatile memory 504 may include physical devices that include random access memory. Volatile memory 504 is typically utilized by logic processor 502 to temporarily store information during processing of software instructions. It will be appreciated that volatile memory 504 typically does not continue to store instructions when power is cut to the volatile memory 504.

Aspects of logic processor 502, volatile memory 504, and non-volatile storage device 506 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 500 typically implemented in software by a processor to perform a particular function using portions of volatile memory, which function involves transformative processing that specially configures the processor to perform the function. Thus, a module, program, or engine may be instantiated via logic processor 502 executing instructions held by non-volatile storage device 506, using portions of volatile memory 504. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 508 may be used to present a visual representation of data held by non-volatile storage device 506. The visual representation may take the form of a graphical user interface (GUI). As the herein described methods and processes change the data held by the non-volatile storage device, and thus transform the state of the non-volatile storage device, the state of display subsystem 508 may likewise be transformed to visually represent changes in the underlying data. Display subsystem 508 may include one or more display devices utilizing virtually any type of technology. Such display devices may be combined with logic processor 502, volatile memory 504, and/or non-volatile storage device 506 in a shared enclosure, or such display devices may be peripheral display devices.

When included, input subsystem 510 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 512 may be configured to communicatively couple various computing devices described herein with each other, and with other devices. Communication subsystem 512 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 500 to send and/or receive messages to and/or from other devices via a network such as the Internet.

The following paragraphs provide additional support for the claims of the subject application. One aspect provides a computer system comprising a processor configured to store a set of audio training data that includes a plurality of audio segments and metadata indicating a word or phrase associated with each audio segment, and receive a set of structured text data that includes one or more target training statements that each include a plurality of text segments comprising a word or phrase. For a target training statement of the set of structured text data, the processor is configured to generate a concatenated audio signal that matches a word content of the target training statement by: comparing the words or phrases of the plurality of text segments of the target training statement to respective words or phrases of audio segments of the stored set of audio training data, selecting a plurality of audio segments from the set of audio training data based on a match in the words or phrases between the plurality of text segments of the target training statement and the selected plurality of audio segments, and concatenating the selected plurality of audio segments into the concatenated audio signal. The processor is further configured to generate an augmented set of training data that includes the set of structured text data paired with respective concatenated audio signals. In this aspect, additionally or alternatively, the processor may be further configured to train an end-to-end artificial intelligence model for automatic speech recognition using the generated augmented set of training data. In this aspect, additionally or alternatively, the set of audio training data may be for one or more domains, and the set of structured text data may be for a target domain that is different than the one or more domains of the set of audio training data. In this aspect, additionally or alternatively, the set of audio training data and the set of structured text data may be for a same domain. In this aspect, additionally or alternatively, the set of audio data may include a plurality of subsets of audio data for different acoustic parameters, wherein the plurality of subsets of audio data may include a plurality of audio segments that are associated with a same word or phrase and different acoustic parameters. In this aspect, additionally or alternatively, the different acoustic parameters may be selected from the group consisting of a background noise parameter, an audio quality parameter, and a speech accent parameter. In this aspect, additionally or alternatively, the plurality of subsets of audio data may be recorded from a plurality of different speakers. In this aspect, additionally or alternatively, the processor may be further configured to train the end-to-end artificial intelligence model using the generated augmented set of training data that includes concatenated audio signals comprising concatenated audio segments recorded from the plurality of different speakers. In this aspect, additionally or alternatively, the processor may be further configured to generate the concatenated audio signal that matches the word or phrase of the target training statement by selecting the plurality of audio segments from the set of audio training data to include at least two audio segments that are selected from different subsets of audio data for different acoustic parameters. In this aspect, additionally or alternatively, the processor may be further configured to select the plurality of audio segments from the set of audio training data based on a distribution parameter that biases the selection for a target acoustic parameter.

Another aspect provides a method comprising, at a processor of a computer device, storing a set of audio training data that includes a plurality of audio segments and metadata indicating a word or phrase associated with each audio segment, and receiving a set of structured text data that includes one or more target training statements that each include a plurality of text segments comprising a word or phrase. For a target training statement of the set of structured text data, the method includes generating a concatenated audio signal that matches a word content of the target training statement by: comparing the words or phrases of the plurality of text segments of the target training statement to respective words or phrases of audio segments of the stored set of audio training data, selecting a plurality of audio segments from the set of audio training data based on a match in the words or phrases between the plurality of text segments of the target training statement and the selected plurality of audio segments, and concatenating the selected plurality of audio segments into the concatenated audio signal. The method further includes generating an augmented set of training data that includes the set of structured text data paired with respective concatenated audio signals. In this aspect, additionally or alternatively, the method may further comprise training an end-to-end artificial intelligence model for automatic speech recognition using the generated augmented set of training data. In this aspect, additionally or alternatively, the set of audio training data may be for one or more domains, and the set of structured text data may be for a target domain that is different than the one or more domains of the set of audio training data. In this aspect, additionally or alternatively, the set of audio training data and the set of structured text data may be for a same domain. In this aspect, additionally or alternatively, the set of audio data may include a plurality of subsets of audio data for different acoustic parameters, wherein the plurality of subsets of audio data may include a plurality of audio segments that are associated with a same word or phrase and different acoustic parameters. In this aspect, additionally or alternatively, the different acoustic parameters may be selected from the group consisting of a background noise parameter, an audio quality parameter, and a speech accent parameter. In this aspect, additionally or alternatively, the plurality of subsets of audio data may be recorded from a plurality of different speakers. In this aspect, additionally or alternatively, the method may further comprise generating the concatenated audio signal that matches the word or phrase of the target training statement by selecting the plurality of audio segments from the set of audio training data to include at least two audio segments that are selected from different subsets of audio data for different acoustic parameters. In this aspect, additionally or alternatively, the method may further comprise selecting the plurality of audio segments from the set of audio training data based on a distribution parameter that biases the selection for a target acoustic parameter.

Another aspect provides a computer device comprising a processor configured to determine a set of structured text data for training an end-to-end artificial intelligence model that is used by an automatic speech recognition application. The set of structured text data includes one or more target training states that each include a plurality of text segments comprising a word or phrase. The processor is configured to send the set of structured text data to a server device to cause the server device to generate an augmented set of training data that includes the set of structured text data paired with respective concatenated audio signals. A concatenated audio signal that matches a word content of a target training statement of the set of structured text data is generated by comparing the words or phrases of the plurality of text segments of the target training statement to respective words or phrases of audio segments of a stored set of audio training data that includes audio segments and metadata indicating a word or phrase associated with each audio segment, selecting a plurality of audio segments from the set of audio training data based on a match in the words or phrases between the plurality of text segments of the target training statement and the selected plurality of audio segments, and concatenating the selected plurality of audio segments into the concatenated audio signal. In this aspect, additionally or alternatively, the processor may be further configured to receive an updated end-to-end artificial intelligence model that has been trained using the augmented set of training data, and cause the automatic speech recognition application to execute using the updated end-to-end artificial intelligence model.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computer system comprising:
a processor configured to:
  store a set of audio training data that includes a plurality of audio segments and metadata indicating a word or phrase associated with each audio segment;
  receive a set of structured text data that includes one or more target training statements that each include a plurality of text segments comprising a word or phrase;
  for a target training statement of the set of structured text data, generate a plurality of concatenated audio signals, each respective concatenated audio signal being generated by:
    comparing the words or phrases of the plurality of text segments of the target training statement to respective words or phrases of audio segments of the stored set of audio training data;
    selecting audio segments from the set of audio training data based on a match in the words or phrases between the plurality of text segments of the target training statement and the selected audio segments; and
    concatenating the selected audio segments into the concatenated audio signal; and
  generate an augmented set of training data that includes the set of structured text data paired with respective concatenated audio signals;
  in a training phase, train an end-to-end artificial intelligence model for automatic speech recognition using the augmented set of training data; and
  in a run-time phase, execute an automatic speech recognition application using the trained end-to-end automatic speech recognition model, wherein
a same word or phrase of two or more audio segments is recorded for a plurality of speakers and/or the same word or phrase of the two or more audio segments is recorded for a plurality of acoustic environments, the selecting includes applying a distribution parameter that biases selection of one of the same word or phrase of the two or more audio segments according to at least one target acoustic parameter, the at least one target acoustic parameter being a background noise parameter, an audio quality parameter, or a speech accent parameter, and based on the distribution parameter, each concatenated audio signal is comprised of words or phrases recorded for two or more speakers of the plurality of speakers and/or two or more acoustic environments of the plurality of acoustic environments.

2. The computer system of claim 1, wherein the set of audio training data is for one or more domains, and the set of structured text data is for a target domain that is different than the one or more domains of the set of audio training data.

3. The computer system of claim 1, wherein the set of audio training data and the set of structured text data are for a same domain.

4. The computer system of claim 3, wherein
the set of audio training data includes a plurality of subsets of audio training data for different acoustic parameters, and
the plurality of subsets of audio training data include a plurality of audio segments that are associated with the same word or phrase and different acoustic parameters.

5. The computer system of claim 4, wherein the processor is further configured to generate the concatenated audio signal that matches the same word or phrase of the target training statement by selecting the audio segments from the set of audio training data to include at least two audio segments that are selected from different subsets of audio data for different acoustic parameters.

6. A method comprising:
at a processor of a computer device:
storing a set of audio training data that includes a plurality of audio segments and metadata indicating a word or phrase associated with each audio segment;
receiving a set of structured text data that includes one or more target training statements that each include a plurality of text segments comprising a word or phrase;
for a target training statement of the set of structured text data, generating a plurality of concatenated audio signals, each respective concatenated audio signal being generated by:
recording a same word or phrase of two or more audio segments for a plurality of speakers and/or recording the same word or phrase of the two or more audio segments for a plurality of acoustic environments;
comparing the words or phrases of the plurality of text segments of the target training statement to respective words or phrases of audio segments of the stored set of audio training data;
selecting audio segments from the set of audio training data based on a match in the words or phrases between the plurality of text segments of the target training statement and the selected audio segments;
applying a distribution parameter that biases selection of one of the same word or phrase of the two or more audio segments according to at least one target acoustic parameter, the at least one target acoustic parameter being a background noise parameter, an audio quality parameter, or a speech accent parameter; and
concatenating the selected audio segments into the concatenated audio signal, the concatenated audio signal including words or phrases recorded for two or more speakers of the plurality of speakers and/or two or more acoustic environments of the plurality of acoustic environments, based on the distribution parameter;
generating an augmented set of training data that includes the set of structured text data paired with respective concatenated audio signals;
in a training phase, training an end-to-end automatic speech recognition model using the augmented set of training data; and
in a run-time phase, executing an automatic speech recognition application using the trained end-to-end automatic speech recognition model.

7. The method of claim 6, wherein the set of audio training data is for one or more domains, and the set of structured text data is for a target domain that is different than the one or more domains of the set of audio training data.

8. The method of claim 6, wherein the set of audio training data and the set of structured text data are for a same domain.

9. The method of claim 8, wherein
the set of audio training data includes a plurality of subsets of audio training data for different acoustic parameters, and
the plurality of subsets of audio training data include a plurality of audio segments that are associated with a same word or phrase and different acoustic parameters.

10. The method of claim 9, further comprising generating the concatenated audio signal that matches the word or phrase of the target training statement by selecting the plurality of audio segments from the set of audio training data to include at least two audio segments that are selected from different subsets of audio data for different acoustic parameters.

11. A computer device comprising:
a processor configured to:
determine a set of structured text data for training an end-to-end artificial intelligence model that is used by an automatic speech recognition application, the set of structured text data including one or more target training statements that each include a plurality of text segments comprising a word or phrase;
send the set of structured text data to a server device to cause the server device to generate an augmented set of training data that includes the set of structured text data paired with respective concatenated audio signals, wherein a concatenated audio signal that matches a word content of a target training statement of the set of structured text data is generated by:
comparing the words or phrases of the plurality of text segments of the target training statement to respective words or phrases of audio segments of a stored set of audio training data that includes audio segments and metadata indicating a word or phrase associated with each audio segment;
selecting a plurality of audio segments from the set of audio training data based on a match in the words or phrases between the plurality of text segments of the target training statement and the selected plurality of audio segments; and concatenating the selected plurality of audio segments into the concatenated audio signal;

receive an end-to-end artificial intelligence model that has been trained using the augmented set of training data; and execute the automatic speech recognition application using the trained end-to-end artificial intelligence model, wherein a same word or phrase of two or more audio segments is recorded for a plurality of speakers and/or the same word or phrase of the two or more audio segments is recorded for a plurality of acoustic environments, the selecting includes applying a distribution parameter that biases selection of one of the same word or phrase of the two or more of the plurality of audio segments according to at least one target acoustic parameter, the at least one target acoustic parameter being a background noise parameter, an audio quality parameter, or a speech accent parameter, and based on the distribution parameter, each concatenated audio signal is comprised of words or phrases recorded for two or more speakers of the plurality of speakers and/or two or more acoustic environments of the plurality of acoustic environments.

\* \* \* \* \*